Kant et al.

Patent Number: 4,564,881
Date of Patent: Jan. 14, 1986

[54] DEVICE FOR ELECTRICALLY MEASURING A LIQUID LEVEL

[75] Inventors: Bernhard Kant, Eschborn; Hasko Jakobs, Hofheim, both of Fed. Rep. of Germany

[73] Assignee: VDO Adolf Schindling AG, Frankfurt am Main, Fed. Rep. of Germany

[21] Appl. No.: 659,472

[22] Filed: Oct. 10, 1984

[30] Foreign Application Priority Data

Oct. 29, 1983 [DE] Fed. Rep. of Germany ....... 3339325

[51] Int. Cl.$^4$ .................... H01G 5/36; G01F 23/26
[52] U.S. Cl. .................................. 361/284; 73/295; 73/304 C
[58] Field of Search .............................. 361/284–286; 73/295, 304 C, 304 R; 324/61 P, 61 R; 338/38, 86, 222

[56] References Cited

U.S. PATENT DOCUMENTS 4,361,037 11/1982 Hauschild et al. .................... 73/295

FOREIGN PATENT DOCUMENTS 2094983 9/1982 United Kingdom .................. 73/295

Primary Examiner—L. T. Hix
Assistant Examiner—Douglas S. Lee
Attorney, Agent, or Firm—Martin A. Farber

[57] ABSTRACT

A device for electrically measuring the level of a liquid in a container has a protective tube (1) in which a conductive foil (5) is arranged untwisted. The protective tube (1) is made of two tube sections (2, 3) which are connected to each other by a joint (4). The joint (4) has a well-defined direction of bend as a result of reinforcing ribs (14, 15). This direction is such that the protective tube (1) can be bent only transverse to the plane of the conductive foil (5). The joint (4) is furthermore so developed that the tube sections (2, 3) are urged into a position in which they are aligned with respect to each other. In this way the device can be installed in a container in such a manner that the lower tube section (3), while forming an obtuse angle with the upper tube section (2), has its bottom end resting against a container bottom (16).

9 Claims, 1 Drawing Figure

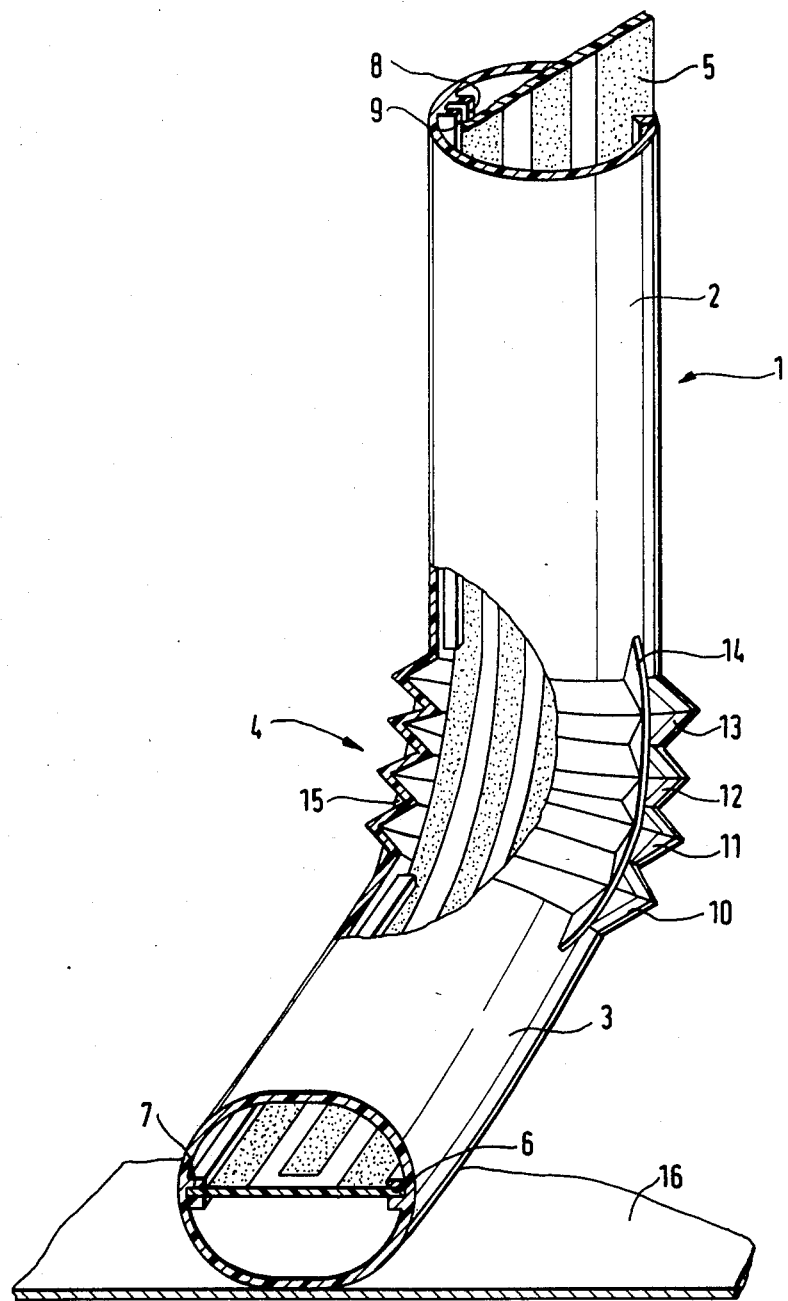

DEVICE FOR ELECTRICALLY MEASURING A LIQUID LEVEL

FIELD AND BACKGROUND OF THE INVENTION

The invention refers to a device for electrically measuring a level of a liquid contained within a container, having a conductive foil which is surrounded by a protective tube and extends into the liquid.

The foil is either a temperature-dependent, electrically externally heated resistance foil whose total resistance as determinable by an evaluation circuit is dependent on the level of the liquid in the container, or a capacitance foil bearing two conductors which form a capacitor. In both cases the conductive foil is formed as a flat band, and is held untwisted in the protective tube by holding members which act on at least one of the longitudinal edges of the foil in such a manner that both of its surfaces can be washed over by the liquid.

Such a device is known, for instance, from West German OS 28 49 143.

In liquid containers, the problem frequently arises that the distance of the upper part of the container from the bottom of the container varies considerably since the manufacturing tolerances are large and since, due to the weight of the liquid contained in it, the bottom of the container bulges out to a greater or lesser extent depending on the level to which it is filled. In order, nevertheless, to obtain a sufficiently high accuracy of measurement even in the region of lower levels of liquid in the container, elastic foil holders have been developed which rest resiliently against the bottom of the container and can thus follow along the movements of the bottom of the container. It is also known to hold a rigid foil holder continuously against the bottom of the container by means of a spring. Such constructions are, however, rather expensive and are seldom used because of cost considerations.

The object of the present invention is to develop a device for electrically measuring a liquid level in which the protective tube which carries the conductive foil is capable of contacting the bottom of the container regardless of container tolerances or changes in container shape without the necessity of special hold-down devices or a complicated development of the measuring device.

SUMMARY OF THE INVENTION

According to the invention, the protective tube (1) comprises two rigid tube sections (2, 3) which are connected to each other by a joint (4) which is movable transverse to the surface of the conductive foil (5), the tube sections (2, 3) being urged by the joint (4) into a position in which they are aligned with each other.

By this development in accordance with the invention the result is obtained that the protective tube can be bent only in those directions in which the conductive foil can also be bent. Therefore the conductive foil is not damaged by the change in shape of the protective tube and it cannot form wrinkles or tear. Since the joint urges the tube sections into a position in which they are aligned with each other, the protective tube can be installed in a container such that the lower tube section contacts the bottom of the container and the two tube sections form an obtuse angle with each other. This has the result that by enlarging the angular orientation with respect to the upper tube section, the lower tube section can follow a different position of the bottom of the container. Special hold-down devices are unnecessary. It should also be emphasized that, as a result of the development in accordance with the invention, the liquid level can always be measured up to the maximum possible height of the level even in the case of greatly differing positions of the bottom of the container.

The joint (4) can be developed in particularly simple fashion if it is formed of a plurality of circumferential tube corrugations (10-13). As a result of the tube corrugations, the protective tube forms a bellows in the region of the joint (4). The direction of bend of the bellows can be established by a lateral rib or two lateral ribs. Hence the joint (4) is provided laterally of the conductive foil (5) on its outside on at least one side with a reinforcing rib (14) which extends along the line of bend of the joint (4).

Another possibility for predetermining the direction of bending of the bellows resides in the cross section of the protective tube (1) having a flexurally rigid form in the region of the joint (4) transverse to the axis of the joint, this cross section of the protective tube being obtainable for example by an oval or rectangular cross section.

Another advantageous development of the invention resides in providing the tube sections (2, 3) on the inside, opposite each other, with two guide grooves (6, 7) as holding means for the conductive foil (5), the conductive foil (5) however extending unguided in the region of the joint (4). Since, in the region of the joint, the protective tube can only be bent in such a manner that the line of bend passes through the plane of the conductive foil, the conductive foil always remains in the middle of the protective tube, even in the region of the joint, so that a guiding or spacing of the conductive foil in the region of the joint is unnecessary. In the rest of the protective tube the conductive foil can be guided by guide grooves in known per se manner wherein the joint (4) is provided laterally of the conductive foil (5) on its outside on at least one side with a reinforcing rib (14) which extends along the line of bend of the joint (4).

The device in accordance with the invention can be produced particularly easily if the protective tube (1) is a subsequently processed extruded part made of a semi-rigid plastic. The required resiliency of the joint is then obtained in positive fashion by the corrugations, so that additional spring means are unnecessary.

The invention permits various embodiments.

BRIEF DESCRIPTION OF THE DRAWING

To illustrate the basic principle, an embodiment is shown in the drawing and will be described below. In the only FIGURE the part of the device which is essential for the invention is shown resting against a container bottom in a perspective, partly broken-away view.

DETAILED DESCRIPTION OF THE PREFERRED EMBODIMENT

The drawing shows a protective tube 1 made of two stiff tube sections 2, 3 which are connected to each other by a joint 4. A conductive foil 5 is arranged within the protective tube 1 and is guided laterally in opposite guide grooves 6, 7. The guide grooves 6, 7 are each formed by two ribs 8, 9 which extend alongside each other in the inside of the protective tube 1.

The arrangement and development of the joint 4 are essential for the invention. In the embodiment of the invention shown in the drawing, the joint 4 is formed of a plurality of circumferential tube corrugations 10, 11, 12, 13. In order to establish a specific direction of bend, a reinforcing rib 14, 15 is provided on the outside on each side of the protective tube 1 in the region of the joint 4. These reinforcing ribs 14, 15 are so arranged opposite each other that, upon deformation of the joint 4, the line of bend passes through the plane of the conductive foil 5. Thus upon the bending of the protective tube 1 the conductive foil cannot buckle or tear. Furthermore, for this reason guidance of the conductive foil 5 by the guide grooves 6 and 7 is unnecessary in the region of the joint 4.

The protective tube 1 is preferably an extruded part of semi-rigid plastic which is further worked in the region of the joint 4 and is resiliently deformable in the region of the joint 4 due to the tube corrugations 10 to 13.

It can furthermore be noted from the drawing that the tube sections 2, 3 are at an obtuse angle to each other and that the lowest end of the lower tube sections 3 rests against a container bottom 16.

The following manner of operation results from this arrangement and shape: If the container bottom 16 moves downwardly, for instance, due to the weight of the liquid present in the container then the lower tube section 3 is capable of following along in this movement, the angle between the upper tube section 2 and the lower tube section 3 increasing. If the container bottom 16 moves upwardly then the angle between the two tube sections 2 and 3 decreases.

The lower tube section 3, for instance, has a small length so that the tube corrugations 10 to 13 extend practically to the container bottom 16. The device according to the invention has the advantage that it can be placed, in simple manner, even into tanks of complicated angular shape, the clearly predetermined direction of bend assuring the correct position of installation.

Due to the fact that the tube sections can be arranged so as to extend diagonally in each case through a partial chamber of a tank formed of a plurality of partial chambers, it is possible in simple manner to adjust the measurement characteristic curve to the shape of the tank.

In the case of an electrically externally heated resistance foil, the foil is heated by passing electric current through the resistance. Both terminals of the resistance are led to the upper end of the protective tube and are connected as the resistance probe in U.S. Pat. No. 4,361,037.

The foil serves as the probe for the measurement of the liquid level. For a probe comprising a capacitive foil a corresponding well known AC measurement circuit is used.

We claim:

1. In a device for electrically measuring a level of a liquid contained within a container, the device having a conductive foil which is surrounded by a protective tube and which extends into the liquid, the foil being either a temperature-dependent electrically externally-heated resistance foil wherein the resistance can be determined by an evaluation circuit and wherein the resistance is dependent on the level of the liquid in the container or a capacitance foil bearing two conductors which form a capacitor wherein the capacitance can be determined by an evaluation circuit and wherein the capacitance is dependent on the level of the liquid in the container, in both cases the conductive foil being developed as a flat band and being held untwisted in the protective tube, by holding members which act on at least one of the longitudinal edges of the conductive foil, in such a manner that both of its surfaces can be washed over by the liquid, the improvement wherein:

the protective tube comprises two rigid tube sections;
joint means for connecting said two rigid tube sections to each other;
said joint means being movable transverse to the surface of the conductive foil;
said joint means urging the tube sections into a position in which they are aligned with other.

2. The device according to claim 1, wherein
said joint means is formed of a plurality of circumferential tube corrugations.

3. The device according to claim 2, wherein
said joint means is provided on its outside and laterally of the conductive foil on at least one side of said joint means with a reinforcing rib, said reinforcing rib extending along a line of bend of the joint means.

4. The device according to claim 2, wherein
the cross section of one of the tube sections has a flexurally rigid form in the region of the joint means transverse to the axis of the joint means.

5. The device according to claim 4, wherein
said cross section of the protective tube is oval.

6. The device according to claim 4, wherein
said cross section of the protective tube is rectangular.

7. The device according to claim 2, wherein
said corrugations of the protective tube form a bellows in a region of the joint means.

8. The device according to claim 1, wherein
said tube sections are formed on the inside, opposite each other, with two guide grooves constituting holding means for the conductive foil, the conductive foil extending unguided in the region of the joint means.

9. The device according to claim 1, wherein
the protective tube is a subsequently-processed extruded part made of a semi-rigid plastic.

* * * * *